United States Patent
Alex et al.

(10) Patent No.: US 12,136,346 B2
(45) Date of Patent: Nov. 5, 2024

(54) SYSTEMS AND METHOD FOR INTEGRATING DRIVER FACING IMAGING DEVICE WITH A VEHICLE BLIND SPOT DETECTION SYSTEM

(71) Applicant: Bendix Commercial Vehicle Systems LLC, Avon, OH (US)

(72) Inventors: Liju V. Alex, Medina, OH (US); Mathew J. John, Avon, OH (US); Martin P Franz, Portage, MI (US); Rohan N Nachnolkar, Elyria, OH (US); Royal Ricky Rodrigues, Avon, OH (US)

(73) Assignee: Bendix Commercial Vehicle Systems LLC, Avon, OH (US)

( * ) Notice: Subject to any disclaimer, the term of this patent is extended or adjusted under 35 U.S.C. 154(b) by 0 days.

(21) Appl. No.: 17/940,554

(22) Filed: Sep. 8, 2022

(65) Prior Publication Data
US 2024/0087458 A1    Mar. 14, 2024

(51) Int. Cl.
*G08G 1/16* (2006.01)
*B60Q 9/00* (2006.01)
*G06V 20/59* (2022.01)

(52) U.S. Cl.
CPC ............. *G08G 1/167* (2013.01); *B60Q 9/008* (2013.01); *G06V 20/597* (2022.01)

(58) Field of Classification Search
None
See application file for complete search history.

(56) References Cited

U.S. PATENT DOCUMENTS

| | | | | |
|---|---|---|---|---|
| 11,242,132 | B2* | 2/2022 | Henderson | B64C 13/16 |
| 11,254,209 | B2* | 2/2022 | Fung | B60K 35/10 |
| 11,273,283 | B2* | 3/2022 | Poltorak | G16H 20/70 |
| 11,364,361 | B2* | 6/2022 | Poltorak | A61B 5/378 |
| 11,390,291 | B2* | 7/2022 | Rothhamel | B60W 50/038 |
| 11,392,117 | B2* | 7/2022 | Pal | H04L 63/08 |
| 11,422,552 | B2* | 8/2022 | Horii | G05D 1/0061 |
| 11,450,156 | B2* | 9/2022 | Bae | B60Q 9/008 |
| 2002/0030591 | A1* | 3/2002 | Paranjpe | B60Q 9/008 |
| | | | | 340/436 |
| 2010/0214087 | A1* | 8/2010 | Nakagoshi | B60W 40/09 |
| | | | | 340/436 |
| 2010/0253526 | A1* | 10/2010 | Szczerba | G08B 21/06 |
| | | | | 340/576 |
| 2012/0212353 | A1* | 8/2012 | Fung | G08G 1/167 |
| | | | | 701/1 |

(Continued)

*Primary Examiner* — Muhammad Adnan
(74) *Attorney, Agent, or Firm* — Crowell & Moring LLP

(57) ABSTRACT

The present disclosure is directed to driver assistance systems, such as blind sport detection systems, that integrate driver facing imaging devices. In one form, a system includes an imaging device configured to capture images of a face of a driver; at least one sensor positioned on the vehicle and configured to detect a distance from the vehicle to an object; and at least one processor configured to analyze the images and determine that the driver is in a drowsy state; determine, based on information received from the at least one sensor, that a distance between the vehicle and the object is decreasing or that the distance between the vehicle and the object is less than a threshold; and in response to the determinations, provide an alert to the driver of a potential side collision.

20 Claims, 2 Drawing Sheets

(56) References Cited

U.S. PATENT DOCUMENTS

| | | | | |
|---|---|---|---|---|
| 2016/0379466 | A1* | 12/2016 | Payant | G08B 21/22 |
| | | | | 340/457 |
| 2018/0056865 | A1* | 3/2018 | Muralidharan | B60W 50/14 |
| 2018/0170375 | A1* | 6/2018 | Jang | B60W 30/0956 |
| 2018/0247109 | A1* | 8/2018 | Joseph | H04N 23/64 |
| 2019/0167941 | A1* | 6/2019 | Yamaguchi | G08G 1/16 |
| 2019/0184998 | A1* | 6/2019 | Zheng | B60W 60/007 |
| 2019/0187701 | A1* | 6/2019 | Zheng | B60W 50/14 |
| 2020/0382236 | A1* | 12/2020 | Lee | G08G 1/165 |
| 2022/0130155 | A1* | 4/2022 | Herbst | G06T 7/20 |
| 2022/0180722 | A1* | 6/2022 | Herman | G06V 10/255 |
| 2022/0309808 | A1* | 9/2022 | Sawai | G06V 20/597 |

* cited by examiner

SYSTEMS AND METHOD FOR INTEGRATING DRIVER FACING IMAGING DEVICE WITH A VEHICLE BLIND SPOT DETECTION SYSTEM

BACKGROUND

Conventional vehicles may include driver assistance systems that utilize one or more sensors to detect stationary or moving objects, such as another vehicle, that are near or approaching a vehicle. For example, driver assistance systems my utilize sensors to detect objects present in a blind spot and/or to a side of a vehicle.

When a driver assistance system detects an object, such as another vehicle, that a vehicle may come in contact with, the driver assistance system may provide an alert to the driver of the vehicle. While a driver in an alert, normal state is able to take corrective action after receiving the alert and avoid a collision, it may be challenging for a driver in another state such as a drowsy state or a distracted state to react in enough time after the warning to take corrective action and avoid a collision.

SUMMARY OF THE DISCLOSURE

The present disclosure addresses the above problem and provides driver assistance systems, such as blind spot detection systems, that integrate with one or more driver facing imaging devices. Driver facing imaging devices allow driver assistance systems to detect a state of a driver and adjust warnings and alerts and/or provide different enhanced warnings or alerts to the driver based on the detected state of the driver.

In one aspect, the disclosure provides a system comprising a memory, an imaging device, at least one sensor, and at least one processor. The imaging device is configured to capture a plurality of images of a face of a driver of a vehicle, and the at least one sensor positioned on a side of the vehicle configured to detect a distance from the side of the vehicle to an Object.

There is at least one processor is in communication with the memory, the imaging device, and the at least one sensor. Further, the at least one processor is configured to execute instructions stored in the memory and to: analyze the plurality of images of the face of the driver of the vehicle captured by the imaging device and determine that the driver is in a drowsy state based on the analysis of the plurality of images; determine, based on information received from the at least one sensor, that a distance between the side of the vehicle and the object is decreasing or that the distance between the side of the vehicle and the object is less than a threshold; and in response to the determination that that the driver is in the drowsy state and the determination that the distance between the side of the vehicle and the object is decreasing or that the distance between the side of the vehicle and the object is less than a threshold, provide an alert to the driver of a potential side collision.

In another aspect, the disclosure provides a method in which at least one processor analyzes a plurality of images of a face of a driver of a vehicle captured by an imaging device configured to capture the plurality of images of the face of the driver, and determines that the driver is in a drowsy state based on the analysis of the plurality of images. Further, the at least one processor determines, based on information received from at least one sensor positioned on a side of the vehicle that is configured to detect a distance from the side of the vehicle to an object, that a distance between the side of the vehicle and the object is decreasing or that the distance between the side of the vehicle and the object s less than a threshold. Additionally, the at least one processor, in response to determining that that the driver is in a drowsy state and determining that the distance between the side of the vehicle and the object is decreasing or that the distance between the side of the vehicle and the object is less than a threshold, provides an alert to the driver of a potential side collision.

DETAILED DESCRIPTION OF THE DRAWINGS

The present disclosure is directed to systems and methods for integrating driver facing imaging devices with driver assistance systems such as blind spot detection systems. As discussed below, integrating driver facing imaging devices with driver assistance systems, such as blind spot detection systems, provide the ability to adapt and modify the operation of those systems based on a detected state of a driver, such as a drowsy driver and/or a distracted driver.

Figure 1:
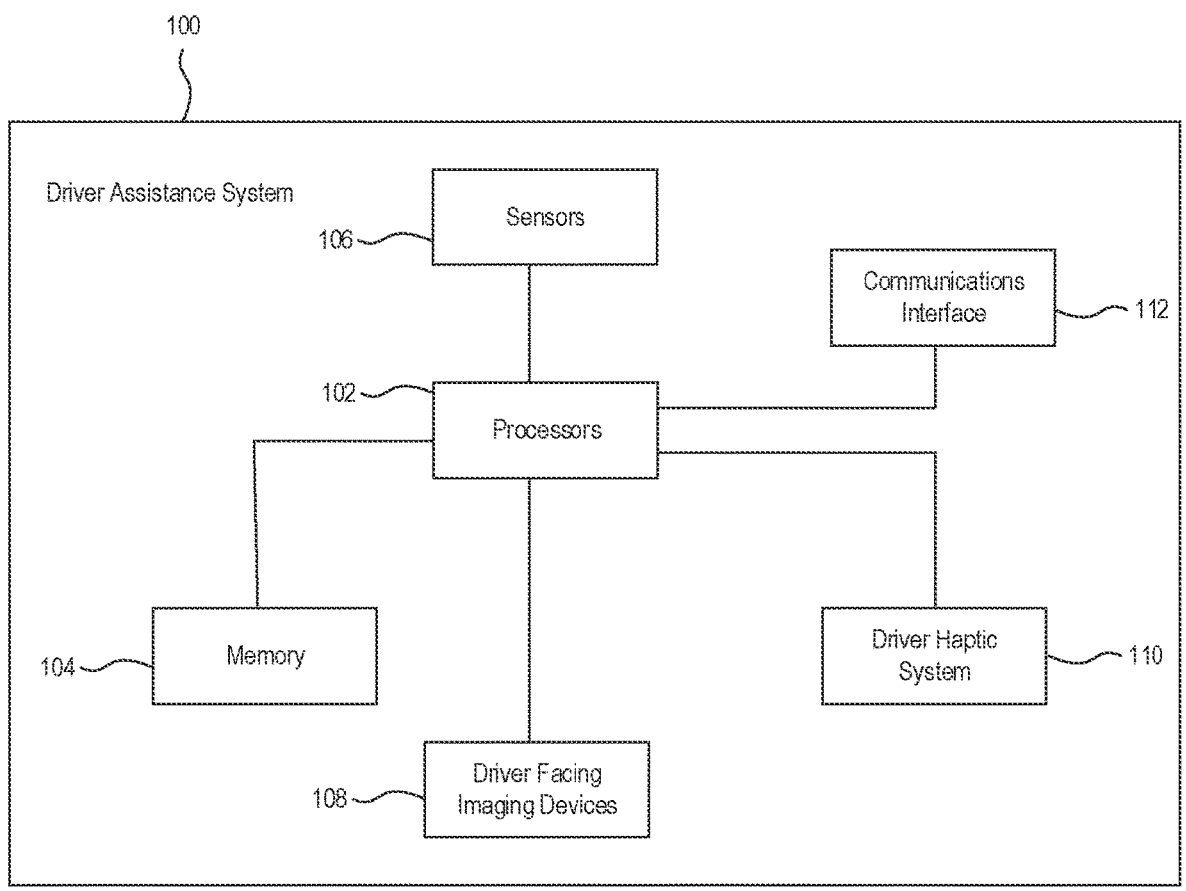
FIG. 1 is a block diagram of one form of a driver assistance system integrating driver facing imaging devices.

FIG. 1 is a block diagram of one form of a driver assistance system that is integrated with driver facing imaging devices. In implementations described below, the driver assistance system is a blind spot detection system. However, it will be appreciated that in other implementations, the driver assistance systems may be other types of systems where determining a state of a driver, such as a drowsy driver or a distracted driver, allows the driver assistance system to provide more timely or accurate information and/or alerts to the driver.

The driver assistance system 100 may include one or more processors 102, a memory 104, one or more sensors 106, one or more driver facing imaging devices 108, a driver haptic system 110 and a communication interface 112. The one or more processors 102 are in communication with the memory 104 and are configured to execute instructions stored in the memory 104. The processor 102 may be a controller, a central processing unit, or any other type of electronic circuitry able to execute instructions stored in the memory 104.

The one or more sensors 106 are in communication with the processors 102 and are sensors that are configured to detect a presence of a stationary or moving object, such a vehicle, and/or to measure a distance from the sensor to a detected object. In some implementations the one or more sensors 106 may be an ultrasonic sensor, a camera, a radar sensor, or a light detection and ranging (LiDAR) sensor. However, in other implementations, other types of sensors may be used that are able to detect a presence of an object and or measure a distance from the sensor to a detected object.

In some implementations, the sensors 106 may be positioned on a vehicle to allow the driver assistance system 100 to monitor areas that may be challenging for a driver to monitor with vehicle mirrors, such as in a blind spot of a vehicle or along the side of the vehicle. However, it will be appreciated that the sensors 106 may be positioned any-where on the vehicle to allow the driver assistance system 100 to monitor objects in relation to the vehicle.

The one or more driver facing imaging devices 108 are in communication with the processors 102, whether the one or more driver facing image devices 108 may be configured to individually, or collectively, capture images of a face of a driver in a vehicle. The driver facing image device 108 may be a camera or any other type of device that may be positioned in an interior of a vehicle and is able to capture images of a driver while operating the vehicle.

The driver haptic system 110 is in communication with the one or more processor 102. In some implementations, the driver haptic system 110 may include motors positioned in a set of a driver and/or in a steering wheel of a vehicle, that when actuated by the processors 102, provide a haptic alert to the driver. However, in other implementations, other types of devices configured to provide a haptic alert to a driver to arouse a response from a driver in a drowsy or distracted state could be used.

The communication interface 112 is also in communication with the one or more processors 102. The communication interface 112 provides an interface through which the driver assistance system 100 may communicate with other vehicle systems such as other driver assistance systems; braking systems; steering systems, navigation systems; display/audio systems of the vehicle; and/or a mobile device of a driver; such as a phone or tablet. The communication interface may additional provide communications to systems external to the vehicle such as servers of a fleet control system.

As discussed in more detail below, during operation the processors 102 execute instructions stored in the memory 104 and communicate with the sensors 106 and the driver facing camera 108. The driver facing camera 108 captures a plurality of images of a face of the driver while operating of the vehicle and the processors 102 analyzes the plurality of images and determines a state of the driver, such as whether the driver is in a drowsy state.

When the sensors 106 and the processors 102 determine a distance between the vehicle and an object detected by the sensors 106 is decreasing or that the distance between the vehicle and the object is within a threshold, and the processor 102 has determined that the driver is in a drowsy state, the processor 102 provides an alert to the driver of a potential collision. In some implementations, the alert may be a visual alert displayed on a display of the vehicle or a visual alert displayed on a phone or a tablet of the driver; an audible alert played on an audio system of the vehicle or played from a phone or tablet of the driver; and/or a haptic alert provided on a steering wheel and/or a set of the driver.

Figure 2:
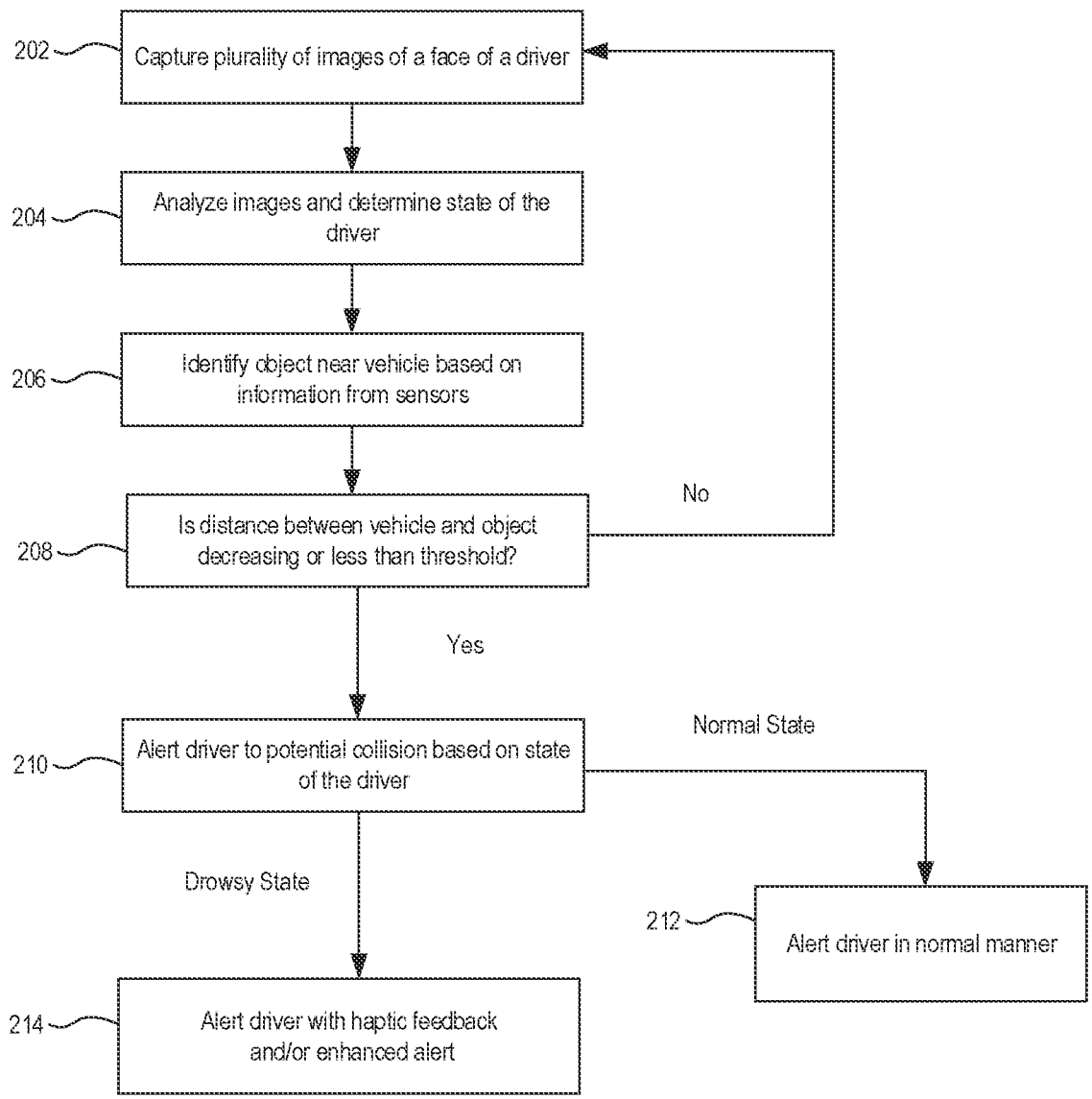
FIG. 2 is a flow chart of one form of a method for operating a driver assistance system utilizing driver facing imaging devices to detecting when a driver is in a drowsy state.

FIG. 2 is a flow chart of one form of a method for operating a driver assistance system integrated with driver facing imaging devices that are configured to detect when a driver is in a drowsy state. In some implementations, the following method may be performed with a driver assistance system such as the system described above in conjunction with FIG. 1.

At step 202, one or more driver facing imaging devices integrated with a driver assistance system capture a plurality of images of a face of a driver of a vehicle. The driver facing imaging device may be a device such as a camera that is positioned in an interior of the vehicle to capture a face of a driver while the driver operates the vehicle.

While in some implementations the driver assistance system includes one driver facing imaging device, in other implementations, the system may include more than one driver facing imaging device. In implementations some including more than one drive facing imaging device, the driver facing imaging devices may be positioned at different locations within the interior of the vehicle to capture a face of a driver from different perspectives.

In some implementations, as part of step 202, at least one processor of the driver assistance system stores the plurality of images in a memory of the driver assistance system.

At step 204, the at least one processor analyzes the plurality of images of the driver and determines, based on the analysis, a state of the driver. For example, the at least one processor may determine whether the driver is in a normal state or in a drowsy state. However, in other implementations, the at least one processor may determine that the driver may be other states such as a distracted state.

In one example, at least one processor determines that the driver is in a drowsy state based on the plurality of images of the face of the driver showing a mouth of a driver opening for at least a period of time and then closing. In some implementations, the at least one processor determines that the driver is in a drowsy state when the driver opens for their mouth for more than three seconds, more than three times within a period of 30 seconds.

In another example, the at least one processor determines that the driver is in a drowsy state based on the plurality of images of the face of the driver showing eyes of the driver closing for at least a predefined period of time. In some implementations, the at least one processor determines that the driver is in a drowsy state when the driver closes their eyes for more than three second, more than three times within a period of 30 seconds. In some further implementations, the processor may determine that the driver is in a drowsy state based on the plurality of images showing eyes of the driver closing for at a predetermined time in combination with specific head movements, such as a drooping of the head.

In a yet further example, the at least one processor determines that the driver is in a drowsy state based on the plurality of images of the face of the driver showing a blink rate of the driver that exceeds a threshold. In some implementations, the at least one processor determines that the driver is in a drowsy state when the driver blinks more than three times per second, more than three times over a 30 second period of time.

The at least one processor may determine that the driver is in a normal state when the processor does not determine that the driver is in a different state such as a drowsy state.

At step 206, the at least one processor identifies an object near the vehicle based on information received from at least one sensor. As discussed above, the at least one sensor may be an ultrasonic sensor, a camera, a radar sensor, a light detection and ranging (LiDAR) sensor, or any other type of sensor that are able to detect a presence of an object such a vehicle and/or measure a distance from the sensor to a detected object. One of skill in the art will appreciate that the sensor is configured to detect both an object that is stationary as well as an object that is moving.

At step 208, the at least one processor determines whether, based on information received from the at least one sensor, a distance between a side of the vehicle and the object is decreasing or that a distance between a side of the vehicle and the Object is less than a threshold. In some implementations, the threshold may be may be six feet from a die of the vehicle and/or a time to collision of less than 1.5 seconds.

When the at least one processor determines at step 208 that the distance between a side of the vehicle and the object is not decreasing and the distance between a side of the vehicle and the object is not less than a threshold, the method loops to step 202 where the above-described procedure is repeated for the same object and/or a newly identified object.

When the at least one processor alternatively determines at step 208 that the distance between a side of the vehicle and the object is decreasing or the distance between a side of the vehicle and the object is less than a threshold, at step 210, the at least one processor alerts a driver of the vehicle to a potential side collision based on the state of the driver.

When the at least one processor has determined at step 204 that the driver is in a normal state, at step 212, the at least one processor notifies the driver of the potential side collision in a normal manner such as displaying a visual alert and/or playing an audible alert.

However, when the at least one processor has determined at step 204 that the driver is in a drowsy state, at step 214, the at least one processor notifies the driver of the potential side collision using an enhanced alert. For example, the at least one processor may provide haptic feedback to a seat in which the driver is sitting and/or provide haptic feedback to a steering wheel of the vehicle to get the attention of the drowsy driver.

Additionally, or alternatively, the at least one processor may provide enhanced visual alerts or audible alerts. In some implementations, the enhanced visual alerts may be, in comparison to normal alerts provided to the driver, more of a display screen illuminating and/or flashing brighter colors on a display screen. Similarly, in some implementations, the enhanced audible alerts may include louder audible alerts, honking short horns of the vehicle, and/or muting/suppressing other noises such music. The at least one processor may display the visual alerts on one or more displays of the vehicle and/or a phone or tablet of the user that is in communication with the vehicle. Similarly, the at least one processor may provide audible alerts through a sound system of the vehicle and/or through a phone and/or tabled of the user that is in communication with the vehicle.

In some implementations, the at least one processor continues to notify the driver at step 214 of the potential collision until the object is no longer detected or until the object is no longer approaching the vehicle.

FIGS. 1 and 2 and the accompanying descriptions teach systems and methods for integrating driver facing imaging devices with driver assistance systems such as blind spot detection systems. As discussed above, integrating driver facing imaging devices with driver assistance systems, such as blind spot detection systems, provide the ability to provide warning alerts to drivers in a drowsy or distracted state in a manner that allows the drowsy or distracted driver time to appreciate a situation and take corrective action to avoid a collision.

The foregoing disclosure has been set forth merely to illustrate the disclosure and is not intended to be limiting. Since modifications of the disclosed embodiments incorporating the spirit and substance of the disclosure may occur to persons skilled in the art, the disclosure should be construed to include everything within the scope of the appended claims and equivalents thereof.

The invention claimed is:

1. A system comprising:
   a memory;
   an imaging device configured to capture a plurality of images of a face of a driver of a vehicle;
   at least one sensor positioned on a side of the vehicle configured to detect a distance from the side of the vehicle to an object; and
   at least one processor in communication with the memory, the imaging device, and the at least one sensor, the at least one processor configured to execute instructions stored in the memory and to:
   analyze the plurality of images of the face of the driver of the vehicle captured by the imaging device and determine that the driver is in a drowsy state based on the analysis of the plurality of images;
   determine, based on information received from the at least one sensor, that a distance between the side of the vehicle and the object is decreasing or that the distance between the side of the vehicle and the object is less than a threshold; and
   in response to both 1) the determination that that the driver is in the drowsy state and 2) the determination that the distance between the side of the vehicle and the object is decreasing or that the distance between the side of the vehicle and the object is less than a threshold, provide an enhanced alert to the driver of a potential side collision;
   wherein the enhanced alert provided to the driver of the potential side collision is different than a normal alert provided to the driver of a potential side collision when the driver is not determined to be in the drowsy state.

2. The system of claim 1, wherein the enhanced alert to the driver comprises a visual alert on a mobile device of the driver.

3. The system of claim 1, wherein the enhanced alert to the driver comprises a visual alert on a dashboard of the vehicle, wherein the enhanced alert comprises at least one of more of a display screen illuminating or the display screen flashing different colors than with the normal alert provided to the driver.

4. The system of claim 1, wherein the enhanced alert to the driver comprises an audible alert that comprises at least one of a louder audible alert, honking of a horn of the vehicle, or suppressing other audible sounds of the vehicle that do not occur when the normal alert is provided to the driver.

5. The system of claim 1, wherein the enhanced alert to the driver comprises haptic feedback to the driver that does not occur when the normal alert is provided to the driver, wherein the haptic feedback comprises at least one of haptic feedback to a steering wheel or haptic feedback to a seat of the driver.

6. The system of claim 1, wherein the at least one processor is configured to determine that the driver is in the drowsy state based on the plurality of images of the face of the driver showing a mouth of a driver opening for at least a predefined period of time and then closing.

7. The system of claim 1, wherein the at least one processor is configured to determine that the driver is in the drowsy state based on the plurality of images of the face of the driver showing eyes of the driver closing for at least a predefined period of time.

8. The system of claim 1, wherein the at least one processor is configured to determine that the driver is in the drowsy state based on the plurality of images of the face of the driver showing a blink rate of the driver that exceeds a threshold.

9. The system of claim 1, wherein the object is stationary.

10. The system of claim 1, wherein the object is moving.

11. A method, comprising:
    analyzing, with at least one processor, a plurality of images of a face of a driver of a vehicle captured by an imaging device configured to capture the plurality of images of the face of the driver, and determining, with the at least one processor, that the driver is in a drowsy state based on the analysis of the plurality of images;

determining, with the at least one processor, based on information received from at least one sensor positioned on a side of the vehicle that is configured to detect a distance from the side of the vehicle to an object, that a distance between the side of the vehicle and the object is decreasing or that the distance between the side of the vehicle and the object is less than a threshold; and in response to both 1) determining that that the driver is in a drowsy state and 2) determining that the distance between the side of the vehicle and the object is decreasing or that the distance between the side of the vehicle and the object is less than a threshold, providing, with the at least one processor, an enhanced alert to the driver of a potential side collision;

wherein the enhanced alert provided to the driver of the potential side collision is different than a normal alert provided to the driver of a potential side collision when the driver is not determined to be in the drowsy state.

12. The method of claim 11, wherein the enhanced alert to the driver comprises a visual alert on a mobile device of the driver.

13. The method of claim 11, wherein the enhanced alert to the driver comprises a visual alert on a dashboard of the vehicle, wherein the enhanced alert comprises at least one of more of a display screen illuminating or the display screen flashing different colors than with the normal alert provided to the driver.

14. The method of claim 11, wherein the enhanced alert to the driver comprises an audible alert that comprises at least one of a louder audible alert, honking of a horn of the vehicle, or suppressing other audible sounds of the vehicle that do not occur when the normal alert is provided to the driver.

15. The method of claim 11, wherein the enhanced alert to the driver comprises haptic feedback to the driver that does not occur when the normal alert is provided to the driver, wherein the haptic feedback comprises at least one of haptic feedback to a steering wheel or haptic feedback to a seat of the driver.

16. The method of claim 11, wherein determining that the driver is in the drowsy state based on the analysis of the plurality of images comprises:

determining that the driver is in the drowsy state based on the plurality of images of the face of the driver showing a mouth of a driver opening for at least a predefined period of time and then closing.

17. The method of claim 11, wherein determining that the driver is in the drowsy state based on the analysis of the plurality of images comprises:

determining that the driver is in the drowsy state based on the plurality of images of the face of the driver showing eyes of the driver closing for at least a predefined period of time.

18. The method of claim 11, wherein determining that the driver is in the drowsy state based on the analysis of the plurality of images comprises:

determining that the driver is in the drowsy state based on the plurality of images of the face of the driver showing a blink rate of the driver that exceeds a threshold.

19. The method of claim 11, wherein the object is stationary.

20. The method of claim 11, wherein the object is moving.

* * * * *